Patented Feb. 2, 1937

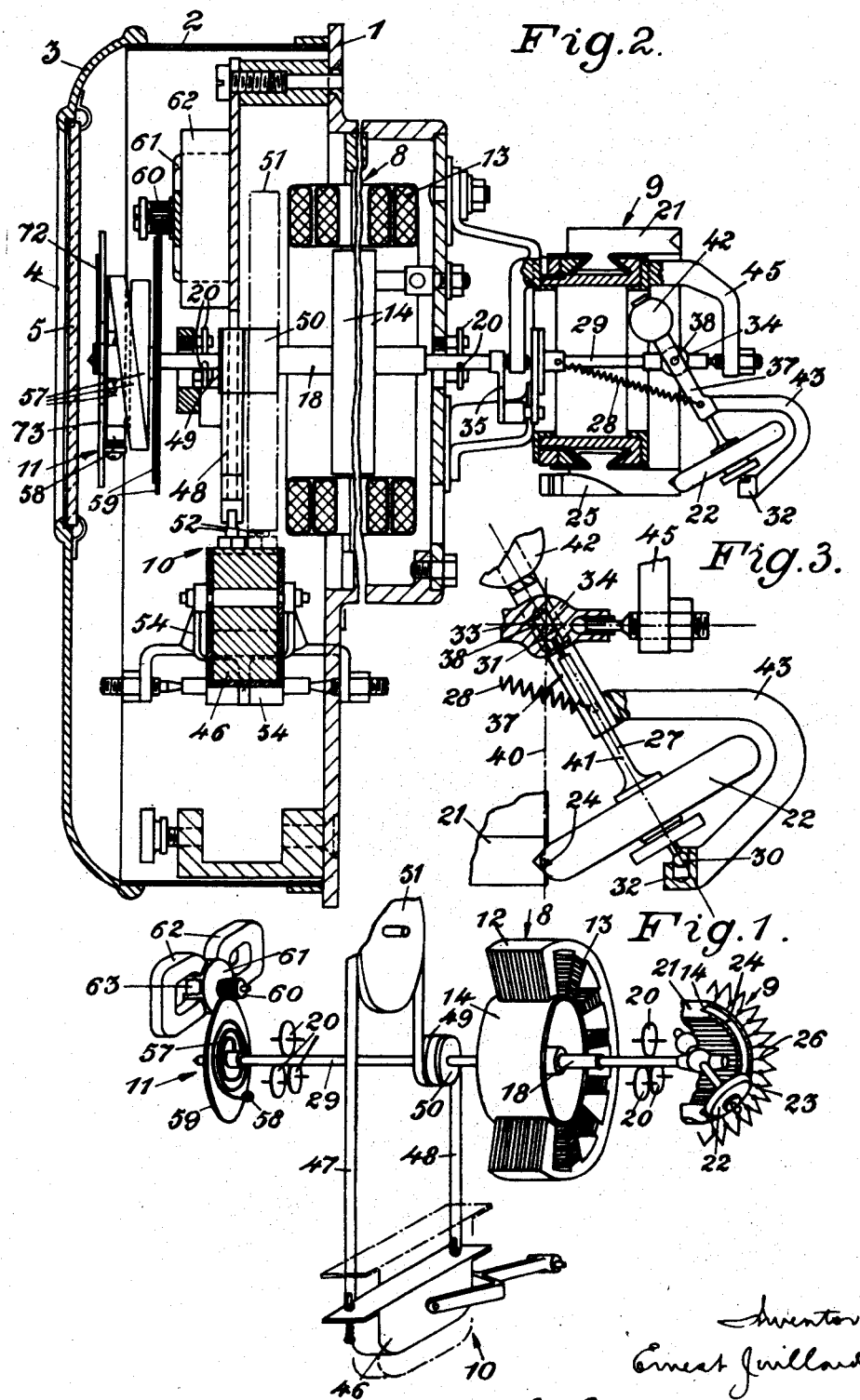

2,069,610

UNITED STATES PATENT OFFICE 2,069,610

DIRECT ACTING ELECTRIC REGULATOR

Ernest Juillard, Lausanne, Switzerland, assignor of one-half to Ateliers H. Cuenod S. A., Chatelaine, near Geneva, Switzerland, a corporation of Switzerland Application October 9, 1933, Serial No. 692,801 In Switzerland November 23, 1932

5 Claims. (Cl. 200—153)

The invention relates to a direct acting electric regulator, that is to say, a regulator which itself moves one or more regulating members without the assistance of a further source of energy.

It is characterized by the fact that its regulating device for the magnitude to be regulated comprises one or more small wheels or rollers moving along a circular groove in a contact track, each roller being in contact with the groove at two points and rotating about an axis inclined relatively to the contact track, the said axis constituting the geometric axis of a cone whose apex is situated at the intersection of the axis of the contact track and the line passing through the points of contact of the roller with the groove.

A constructional form of the regulator is shown by way of example in the accompanying drawing, in which:

Figure 1 is a diagram of a regulator according to the invention,

Figure 2 is a vertical axial section,

Figure 3 relates to a detail.

The regulator shown comprises a metal base plate 1 adapted to be fixed on a switchboard panel. The said base plate carries on its front face a metal lid 2—3 of rectangular form comprising a glass portion 5 allowing the internal mechanism to be seen.

Among other things, the regulator comprises:

A device 8 measuring the electrical magnitude which is to be regulated,

The regulating device 9 modifying the said magnitude according to requirements,

An antagonistic device 10 balancing the action of the measuring device,

A control device 11.

The measuring device is constituted by a rotating field motor 8 arranged in an opening in the plate 1. The motor 8 comprises a stator 12, which is similar to those of induction motors, and through the winding 13 of which there passes a current proportional to the electric magnitude to be measured, and a rotor 14 in the form of a drum. The stator 12 may be wound for three-phase or single-phase current.

The shaft 18 of the rotor 14 is made of steel hardened in the region of its ends. It is supported by the hardened portions in two bearings, each comprising three rollers 20 of hardened steel.

The regulating device 9 comprises the contact track 21, situated at the rear of the plate 1, and a small wheel or roller 22 moving along the contact track.

The said contact track is constituted by a commutator similar to those of direct current electric machines, has its axis horizontal and is fixed to the base plate 1. Its copper segments are provided with grooves 25 at their front end for connections 26 connecting the said segments to resistances 23, which give rise to the desired regulation during the movements of the roller 22. In the rear annular face of the said contact track there is machined an annular groove 24 of angular cross section, the two sides of which are inclined at about 45° to the axis and which is engaged by the said roller 22.

The said roller, of graphite for example, comprises a rim having a semi-circular cross section, being thus in contact with the sides of the groove 24 at two points. The two points of contact are situated in a median plane of the contact track 21, so that a straight line 40 passing through them intersects the geometrical axis of the said track at 38. The geometrical axis 41 of the inclined mechanical axis 27 of the roller 22 also passes through the said point of intersection 38. The result thereof is that the said roller 22, in its movement on the track 21, rolls without sliding on the latter in the manner of a cone rolling on a plane. The arrangement indicated has the twofold advantage of diminishing the rolling effort and of practically eliminating the wear of 21, 22, due to the movement of the roller 22.

The axis 27 terminates at both ends in balls 30, 31. The said axis rests by one of the said balls 30 in a pedestal bearing 32, and by the other 31 in a hole 33 of a part 34 belonging to a shaft 29. The latter is driven by the shaft 18 of the measuring device 8 through the medium of a crank 35. A stirrup 37 can pivot on the part 34 about a geometric axis passing through the point 38. The said pivot carries on one side of the shaft 29 a curved arm 43 provided with the pedestal bearing 32, and on the other side of the shaft 29 a weight 42 for balancing the weight of the roller 22 and of the arm 43.

The good contact necessary between the track 21 and the roller 22 is obtained by subjecting the said roller to a given effort due to two springs 28. The latter are symmetrically arranged relatively to the axis of the track 21 and are attached by one end to the stirrup 37 and by the other to the shaft 29. The ball 30 is situated on a line parallel to the shaft 29 and passing through the apex of the groove 24, so that the pressures exerted at the two points of contact are equal. Due to the balls 30, 31 and the hole 33 in the part 34, the shaft 37 can respond freely to the pull of the springs. As the said stirrup 37 turns about an axis passing the point 38, the major portion of the effort provided by the springs 28 is transmitted to the roller 22, and consequently the reaction on the shaft 29 is a minimum, comprising a small axial thrust from the front to the rear on the rear bearing 45, and two small lateral efforts on the bearings 20. The bearing 45 is a ball thrust bearing which reduces friction to a minimum.

The shaft 18 is provided at its front end with a pointer 72 moving over an indicator circle 73 and showing the position occupied at any instant by the roller 22 on the contact track 21.

The antagonistic device 10 comprises a counterpoise 46 suspended in front of the plate from two thin steel bands 47, 48 winding in opposite directions to each other on two steel pulleys 49, 50 of the same diameter keyed to the shaft 18 of the measuring device. The two bands are secured to their pulleys by pins not shown in the drawing. The band 47 passes over an additional pulley 51, supporting the weight of the counterpoise 46, and then winds round its pulley 49 in the opposite direction to the other pulley. It is secured to the said pulley by a pin not shown, which prevents it sliding on the said pulley 51. The latter and the pulley 49 have relative diameters and positions such that the two branches of the band 47 are vertical. The band 48 is also vertical.

The control device 11 is situated on the front face of the plate 1 and comprises a resilient element and delaying means.

The resilient element is a spiral spring 57, one end of which is fixed to the shaft 18 of the device 8 and the other to a stud 58 on a disc 59 idle on the shaft 18. The disc 59 is mounted on a hub forming a bearing and meshes with a pinion 60 integral with a drum 61 rotating between two permanent magnets 62 and an internal iron core 63.

The construction described functions as follows, assuming that the single-phase voltage of an electrical machine is to be regulated astatically:

The voltage which is to be regulated is measured by the device 8, either directly or through the medium of a voltage transformer. The current passing through the winding 13 produces a rotating field which exerts on the rotor 14 a torque corresponding to the value of the voltage. The torque is balanced by the antagonistic torque of the counterpoise 46, and the roller 22 occupies the desired position on the contact track 21 to produce in the machine an excitation corresponding to the conditions of voltage and load momentarily imposed on the said machine.

If these conditions change, the voltage applied to the regulator also changes, and the torque exerted on the rotor 14 varies. In the case in which, for example, there is a drop in voltage, the counterpoise 46 preponderates and the roller 22 is moved in the required direction for increasing the excitation of the machine, so as to raise the voltage. Due to the "time constant" or magnetic inertia of the said machine, the new condition of excitation is not established immediately, and the voltage will lag behind the movement of the roller 22 which, without the retarding action of the delay device, might move too far and have to return again afterwards in order to move forward again and so on for some length of time.

The machine regulated by the present constructional form may be employed as servomotor for the regulation of another machine.

The measuring device may be designed to be supplied with direct current instead of alternating current.

The rotary part of the measuring device may also make several revolutions.

What I claim is:—

1. A direct-acting electric regulator, the regulating device of which for the magnitude to be regulated comprises at least one roller and a contact track comprising a plurality of spaced contact points and having a groove in the form of at least a portion of an arch therein and having an axis, the roller having an edge, said edge being movable along said groove in the contact track, the edge of the roller and the groove having cross sections so mutually shaped that in any position they are in contact in only two points, each roller turning about an axis inclined relatively to the contact track and constituting the geometrical axis of a truncated cone, said cone having an apex, the apex of said cone being situated at the intersection of the axis of the contact track and of the line passing through the two points of contact of the roller with the groove.

2. A direct-acting electric regulator, the regulating device of which for the magnitude to be regulated comprises at least one roller and a contact track comprising a plurality of spaced contact points and having a groove in the form of at least a portion of a circle therein and having an axis, the roller having an edge movable along said circular groove in said contact track, the edge of the roller and the groove having cross sections so mutually shaped that in any position they are in contact only in two points, (said contact track being constituted by a direct current machine commutator), each roller turning about an axis inclined relatively to the contact track and constituting the geometrical axis of a truncated cone, said cone having an apex, said apex being situated at the intersection of the axis of the contact track and of the line passing through the two points of contact of the roller with the groove.

3. A direct-acting electric regulator, the regulating device of which for the magnitude to be regulated comprises at least one roller and a contact track comprising a plurality of spaced contact points and having a circular groove therein and having an axis, the roller having an edge, and said edge being movable along the circular groove provided in the contact track, said edge having a cross section in the form of a considerable portion of a circle, so that the roller edge and the groove are only in contact in two points, the roller turning about an axis inclined relatively to the contact track and constituting the geometrical axis of a truncated cone, said cone having an apex, said apex being situated at the intersection of the axis of the contact track and of the line passing through the two points of contact of the roller with the groove.

4. A direct acting electric regulator, the regulating device of which for the magnitude to be regulated comprises at least one roller and a contact track comprising a plurality of contact points and having an annular groove therein and having an axis, the roller having an edge movable along said annular groove, the groove being of symmetrical triangular cross section in said contact track, the cross section of the roller being so shaped that the edge and the groove are only in contact in two points, each roller turning about an axis inclined relatively to the contact track and constituting the geometrical axis of a truncated cone, the apex of the cone being situated at the intersection of the axis of the contact track and of the line passing through the two points of contact of the roller with the groove.

5. A direct acting electric regulator, the regulating device of which for the magnitude to be regulated comprises at least one roller and a contact track comprising a plurality of contact points and having a circular groove therein and having an axis, the roller having an edge movable along said circular groove in said contact track, the edge of the roller and the groove having cross sections so shaped that in any position they are in contact only in two points, each roller turning about an axis inclined relatively to the contact track and constituting the geometrical axis of a truncated cone, the apex of said cone being situated at the intersection of the axis of the contact track and of the line passing through the two points of contact of the roller with the groove, and means whereby pressures exerted at the two points of contact of each roller with each groove are equalized.

ERNEST JUILLARD.